Figures 1, 2:
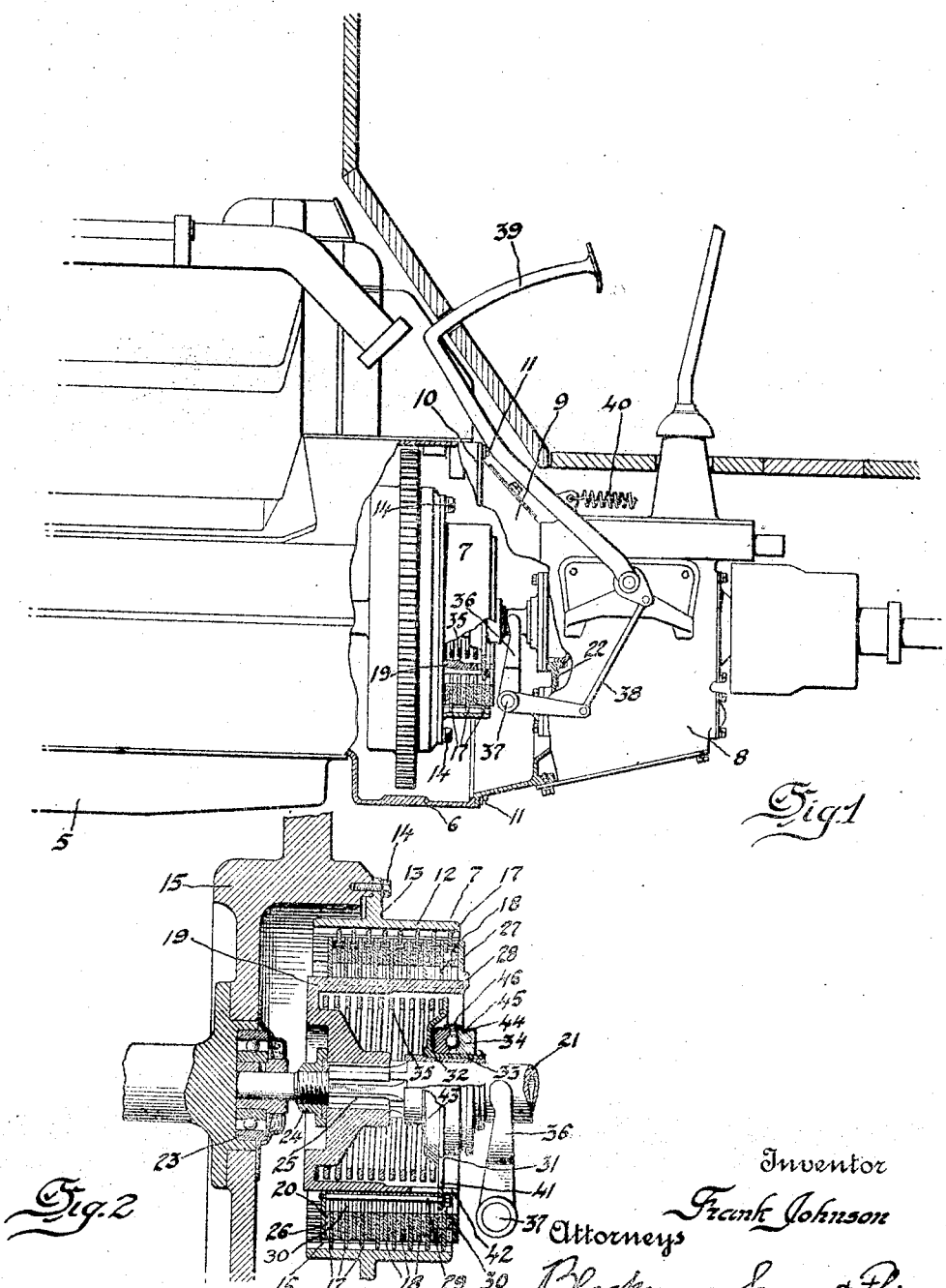

March 16, 1926.

F. JOHNSON

CLUTCH CONSTRUCTION

Original Filed July 18, 1918

1,576,513

Inventor
Frank Johnson
Attorneys
Blackmore Spencer & Flint

Patented Mar. 16, 1926.

1,576,513

UNITED STATES PATENT OFFICE.

FRANK JOHNSON, OF DETROIT, MICHIGAN, ASSIGNOR TO GENERAL MOTORS CORPORATION, OF DETROIT, MICHIGAN, A CORPORATION OF DELAWARE.

CLUTCH CONSTRUCTION.

Original application filed July 18, 1918, Serial No. 245,471. Divided and this application filed October 9, 1922. Serial No. 593,211.

*To all whom it may concern:*

Be it known that I, FRANK JOHNSON, a citizen of the United States, and a resident of Detroit, county of Wayne, and State of Michigan, have invented certain new and useful Improvements in Clutch Construction, of which the following is a full, clear, concise, and exact description, such as will enable others skilled in the art to which the invention relates to make and use the same, reference being made therein to the accompanying drawings, which form a part of this specification.

The invention relates to clutch mechanism, and, while in some respects of more general application, is especially designed for use in connection with transmission mechanism for motor vehicles.

One of the main objects of the invention is to materially reduce the distance which the speed changing mechanism overhangs the engine casing, at the same time retaining a disk clutch as the driving element. This is accomplished by so constructing the clutch barrel that the thrust collar or bearing whereby the operating force is transmitted to the clutch spring is receivable therein. The front wall of the casing for the speed changing gears may thus be positioned closer to the rear face of the clutch than has been possible heretofore.

Further objects and advantages will appear from the following description taken in connection with the accompanying drawings, in which—

Figure 1 is a side view, parts being broken away, showing the general arrangement of the clutch mechanism as employed in the power plant of a motor vehicle, and Figure 2 is an enlarged vertical section showing the details of the clutch mechanism.

Referring to the drawings, 5 indicates an engine casing having a rearward extension 6 by which the clutch 7 is for the most part enclosed. The change speed gear casing 8, preferably of aluminum, has a flaring front end 9 flanged circumferentially at 10 and attached to the engine casing by screws 11, said end being arranged to enclose a portion of the clutch. The clutch is of the disk type and includes a case 12 having at a point preferably intermediate in its length an annular flange 13 whereby it may be bolted as at 14 to the flywheel 15. Slidable in the case, but constrained to turn therewith by splines 16, are the metal disks 17 that alternate with other disks 18 which are in turn slidable along but constrained to rotate with a hollow barrel 19. One set of the disks, shown as the disks 17, is faced with friction material 20.

The hollow clutch shaft appears at 21, the rear end of which is mounted in a suitable bearing carried by the cross wall 22 of the casing 8 and the front end being supported in a bearing 23 carried by the flywheel. A nut 24 threaded on the clutch shaft receives the longitudinal thrust and splines 25 cause the shaft to turn with the barrel 19.

The barrel is provided with the front end plate 26 and the rear end plate 27, both splined thereon, and the plate 27 is seated against an abutment 28. The front end plate 26 has fixed thereto a series of bolts 29 which pass through slots 30 in the disks 17 and are fixed to a spider 31 at the rear end of the clutch.

The spider preferably includes a bushing 32 and is extended rearwardly to form a tubular portion 33 upon which a thrust bearing or collar 34, preferably of the ball type, is mounted. A spring 35 housed in the barrel 19 tends to force the spider to the right (Figure 2) and normally holds the sets of disks tightly together. Movement of the spider in the opposite direction is accomplished by means of a clutch yoke 36 pivoted at 37 and connected by a link 38 to a clutch pedal 39. Application of pressure to the pedal 39 will cause movement of the yoke 36 in a counterclockwise direction about its pivot 37, thereby compressing the spring 35 and setting the clutch disks free from one another. The yoke 36 is normally held free or spaced from the collar 34 by means of a spring 40, thus eliminating wear.

It will be particularly noted that the inner diameter of the barrel 19 is greater than the outer diameter of the collar or thrust bearing 34, from which it follows that the latter, as well as the spider 31, the arms 41 of which are received in slots 42 in the barrel, is adapted to enter the barrel and may be positioned in whole or in part forwardly of the rear face thereof. The distance between the engine casing and the cross wall 22 is thus materially lessened, as compared with the corresponding dimension in the event the collar 34 were of larger diameter than the internal diameter of the barrel, and the leverage of the heavy overhanging speed changing mechanism in respect to the engine casing is appreciably reduced; the saving of space is also advantageous. A further material reduction in length is secured by depressing the central portion of the spider forwardly within the spring 35, as shown at 43.

The races of the collar 34 are preferably enclosed by a sheet metal stamping 44 which is turned inwardly along the front face of the front race and has its rear margin spun into a circumferential groove at 45 in the rear race. By removal of the plug 46 the bearing may be oiled, as is obvious. The stamping therefore serves both to exclude dust and to retain lubricant.

The actual details of the various novel features of the invention may be widely varied without departing from the spirit of the invention, and I do not therefore wish to be limited except as indicated by the subjoined claims.

This application is a division of the application upon which was granted Patent No. 1,447,856, dated March 6, 1923.

I claim:

1. In a disk clutch, a hollow clutch barrel, driving and driven elements on the exterior of said barrel, the outer end of the barrel provided with slots, a spider having arms extending through said slots, means outside the barrel at the inner end thereof for forcing said elements into engagement, means connecting the extremities of said arms to the said forcing means, and means for moving said spider to engage or disengage said elements.

2. A clutch comprising a hollow barrel having one end closed, a helical spring entirely housed within said barrel and having one end seated against the closed end thereof, a spider movable axially of said barrel and having a seat for the other end of said spring, the central portion of the spider being depressed and positioned within said spring and a bearing positioned in said depression, whereby the length of the clutch is reduced and the spider and bearing are housed substantially within said barrel.

3. In a disk clutch, a hollow clutch barrel having one end closed, driving and driven disks arranged outside of said barrel and slidable axially thereof, and means for causing engagement and disengagement of said disks including a helical spring housed within said barrel and having one end seated against the closed end of the barrel, a clutch spider engaging the other end of the spring and having a centrally depressed portion extending within the spring, an antifriction bearing seated in said depression, a clutch yoke engageable with said bearing, and means actuated by movement of said spider to cause engagement of said disks, the spider and bearing being adapted to be positioned substantially within the barrel.

In testimony whereof I affix my signature.

FRANK JOHNSON.